(12) United States Patent
Hyun (10) Patent No.: US 10,609,916 B2
(45) Date of Patent: Apr. 7, 2020

(54) FISHING REEL HAVING LOCK LEVER FOR OPENING AND CLOSING PALM-SIDE FIRST SIDE COVER

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 16/287,225

(22) Filed: Feb. 27, 2019

(65) Prior Publication Data

US 2019/0269116 A1 Sep. 5, 2019

(30) Foreign Application Priority Data

Mar. 2, 2018 (KR) ........................ 10-2018-0025285

(51) Int. Cl.
*A01K 89/01* (2006.01)
*A01K 89/015* (2006.01)

(52) U.S. Cl.
CPC ............................. *A01K 89/01921* (2015.05)

(58) Field of Classification Search
CPC ............................................... A01K 89/01921
See application file for complete search history.

(56) References Cited

U.S. PATENT DOCUMENTS

| | | | | |
|---|---|---|---|---|
| 5,839,682 A * | 11/1998 | Kim | ..................... | A01K 89/015 242/314 |
| 5,873,535 A * | 2/1999 | Jeung | ................... | A01K 89/015 242/314 |
| 6,206,312 B1 * | 3/2001 | Oh | .................. | A01K 89/01921 242/314 |
| 8,925,848 B2 * | 1/2015 | Niitsuma | ............... | A01K 89/02 242/314 |
| 2013/0233957 A1 * | 9/2013 | Niitsuma | ............. | A01K 89/015 242/285 |
| 2013/0320125 A1 * | 12/2013 | Hyun | ............... | A01K 89/01923 242/312 |
| 2018/0199553 A1 * | 7/2018 | Hyun | ............... | A01K 89/01124 |
| 2019/0141972 A1 * | 5/2019 | Oogose | ............. | A01K 89/0193 242/314 |

FOREIGN PATENT DOCUMENTS

KR 20150065352 6/2015

* cited by examiner

*Primary Examiner* — Emmanuel M Marcelo
(74) *Attorney, Agent, or Firm* — Cantor Colburn LLP (57) ABSTRACT

A fishing reel having a lock lever for opening and closing a palm-side first side cover on a side of a frame opposite to a handle. The first side cover is easily and quickly opened with one hand without risk of losing the cover, and the lock lever is automatically locked because the lock lever is recovered automatically by an elastic body. The fishing reel includes: a stop bar projecting from a palm-side mount of a frame; and a lock lever which includes a body shafted to an inner-side surface of the first side cover to be rotatable, a locking projection connected to the body to be turned together with the body when the body is rotated and blocked by the stop bar when the first side cover is closed, and an opening portion projecting from the body to be exposed outside the first side cover and rotating the body.

4 Claims, 15 Drawing Sheets

FISHING REEL HAVING LOCK LEVER FOR OPENING AND CLOSING PALM-SIDE FIRST SIDE COVER

BACKGROUND OF THE INVENTION

Field of the Invention

The present invention relates generally to a fishing reel in which a palm-side first side cover provided on a side of a frame opposite to a handle is opened by rotating the first side cover in one direction. More particularly, the present invention relates to a fishing reel, which the first side cover is capable of being opened and closed with one hand without risk of losing the first side cover since an opening rotational direction of the first side cover and an unlocking turning direction of a lock lever coincide in the same direction, and which has the lock lever for opening and closing the palm-side first side cover, the lock lever being configured to be automatically locked when the lock lever is recovered automatically by an elastic body and rotates the first side cover in a locking direction.

Description of the Related Art

Generally, a bait casting reel (hereinbelow, it is referred to as a fishing reel) includes a frame provided with a spool, a palm-side first cover coupled to a first side of the frame, a gear-side second side cover coupled to a second side of the frame, and a handle provided on the second side cover, which has only a difference in operational structure of brake dial or tension nut according to braking method of the spool.

Such the fishing reel is configured such that the second side cover having relatively low opening and closing frequency is solidly coupled to the frame by bolting.

When fishing proceeds on not only flat area but also uneven area such as rocks on a seashore, the first side cover provided on a side of the frame opposite to the handle has relatively high opening and closing frequency in various situations, such as when the spool is separated for maintenance of the fishing reel or when position of a brake shoe in a centrifugal brake type is adjusted to prevent backlash, and this first side cover has a structure of being opened, separated, and then recoupled to resume fishing.

As a related art, a cover mounting device for a fishing reel is proposed as disclosed in Korean Patent No. 10-1534273.

In the above related art, a locking lever is included as a locking means of the first side cover to rotate a spool cover inside a cover and puts the cover into a locked state or unlocked state. Here, operation of the locking lever and attaching and detaching operation of the first side cover are dualized, which is inconvenient to use.

That is, the locking lever should be put into an unlocked state, then the first side cover should be pulled out in an axial direction of the spool to be separated and, conversely, the first side cover should be coupled to the frame, then the locking lever should be put into a locked state, which is inconvenient to use.

Particularly, since an opening direction of the first side cover and an operational direction of the locking lever are not the same, when the locking lever is put into the unlocked state and the first side cover is not separately gripped, there is risk that the first side cover is separated from the frame and is lost.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a fishing reel having a lock lever for opening and closing a palm-side first side cover provided on a side of a frame opposite to a handle. The fishing reel is configured such that an operational direction of the lock lever and a rotational opening and closing direction of the first side cover coincide in the same direction, so that the first side cover is separated only by the unlocking operation of the lock lever and the lock lever automatically performs a locking operation only by closing the first side cover. Accordingly, a user can easily and quickly attach and detach the first side cover, thereby reducing risk of losing the first side cover.

In order to achieve the above object, according to one aspect of the present invention, there is provided a fishing reel in which a palm-side first side cover provided on a side of a frame opposite to a handle is separated by rotating the cover in a first direction, the fishing reel includes: a stop bar projecting from a palm-side mount of a frame; and a lock lever which includes a body shafted to an inner-side surface of the first side cover to be rotatable, a locking projection connected to the body to be turned together with the body when the body is rotated and blocked by the stop bar when the first side cover is closed, and an opening portion projecting from the body to be exposed outside the first side cover and rotating the body, and which the lock lever is configured such that a rotational direction of the body rotated by the opening portion is the same as a direction in which the first side cover is rotated and opens so that the locking projection is released from the stop bar. When the lock lever is turned in an unlocking direction, the first side cover may be rotated together with the lock lever and is separated from the frame.

The fishing reel according to the present invention further includes: an elastic body for elastically supporting the lock lever so that the body is rotated in a second direction. When the first side cover is rotated in a locking direction, the locking projection may be automatically blocked by the stop bar and the first side cover is coupled to the frame.

In the fishing reel according to the present invention, the elastic body may be a coil spring that is configured such that a first end thereof is supported by the first side cover and a second end thereof is supported by the lock lever, thereby exerting elastic force to turn the lock lever in the second direction.

In addition, in the fishing reel according to the present invention, the elastic body may be a torsion spring that is configured such that a first end thereof is connected to the first side cover and a second end thereof is connected to the lock lever, thereby exerting elastic force to turn the lock lever in the second direction.

According to the present invention, the fishing reel having the lock lever for opening and closing the palm-side first side cover provided on a side of the frame opposite to a handle has following features.

Since the operational direction of the lock lever and the opening and closing direction of the first side cover coincide in the same direction, the first side cover is rotated to be immediately separated from the frame when the lock lever is put into an unlocked state. Contrary, the lock lever is automatically put into a locked state when the first side cover is closed. Accordingly, the first side cover can be easily and conveniently opened and closed.

In addition, opening and closing of the first side cover can be operated with one hand, and there is no risk of losing the first side cover while operating the lock lever.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention will now be described in detail on the basis of aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters, refer to like elements having like functions throughout, and unless the context clearly indicates otherwise, elements referred to by reference numerals of the drawings should be understood on the basis of this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from other constitutive elements, but the constitutive elements should not be limited to a manufacturing order, and the terms described in the detailed description of the invention may not be consistent with those described in the claims.

Figure 1:
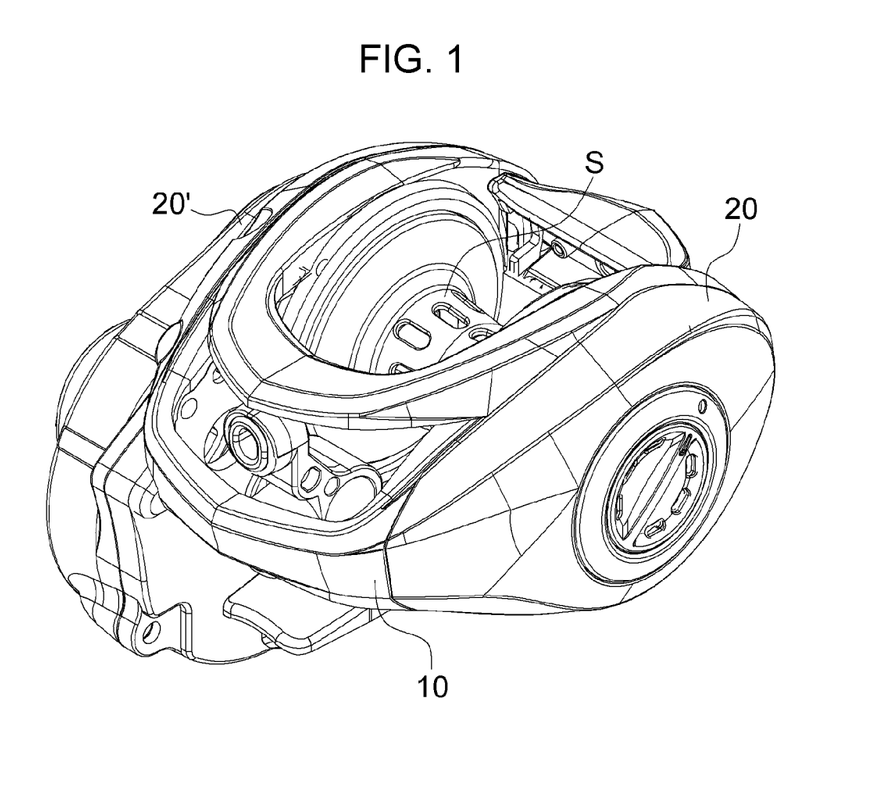
FIGS. 1 and 2 are perspective views showing the appearance of a fishing reel according to the present invention.
Figure 2:
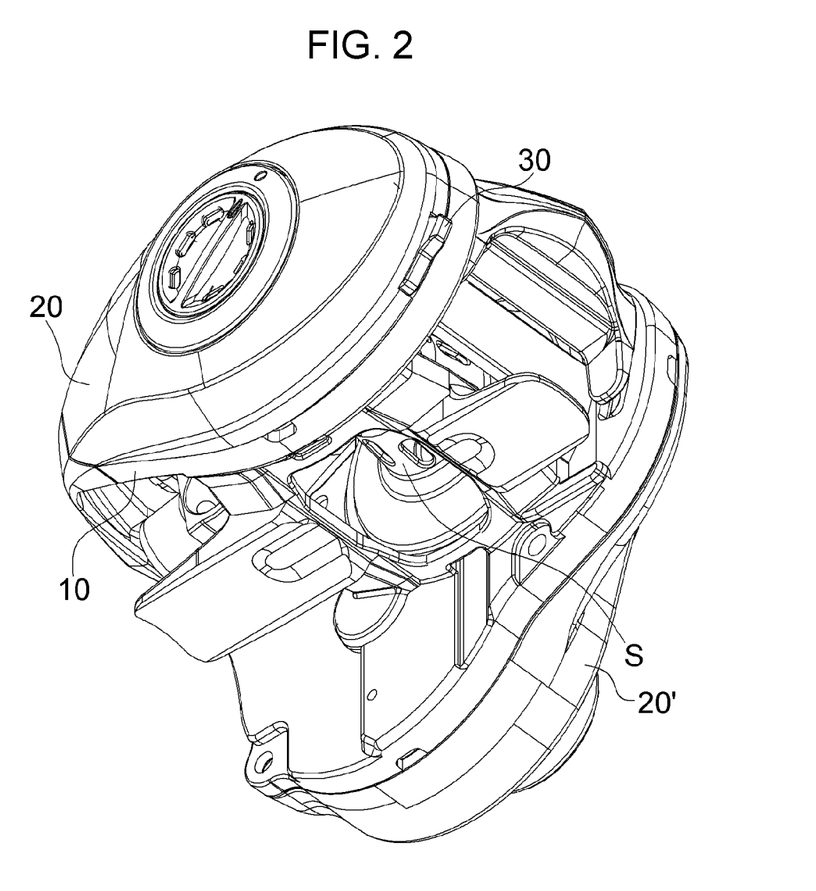
Figure 3:
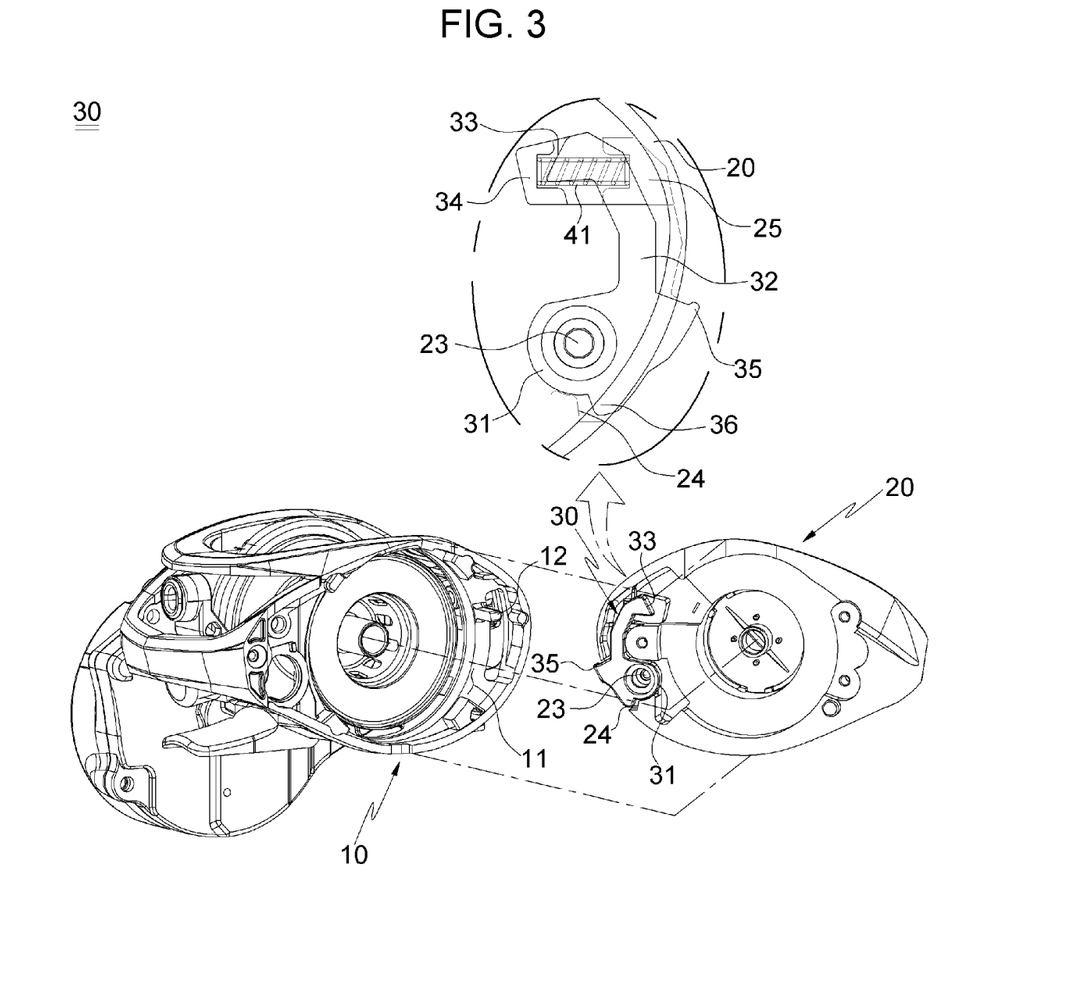
FIG. 3 is a perspective view showing the inside of a first side cover according to the present invention.

For convenience of the description of a fishing reel having a lock lever for opening and closing a palm-side first side cover according to the present invention, when an approximate direction rather than a precise direction is specified with reference to FIG. 1, a lower side is determined on the basis of a direction to which gravity is applied, and up and down directions and right and left directions are determined on the basis of the lower side. This standard may be also applied to the other drawings, and directions may be specified and described on the basis of this standard unless the detailed description of the invention and the claims specially indicate otherwise.

Hereinbelow, a fishing reel having a lock lever for opening and closing a palm-side first side cover provided on a side of a frame opposite to a handle according to the present invention will be described in detail with reference to the accompanying drawings.

As shown in FIGS. 1 to 7, the present invention relates to the fishing reel in which the palm-side first side cover 20 provided on the side of the frame 10 opposite to the handle may be separated by rotating the cover 20 in a first direction.

The fishing reel includes the frame 10 mounted on a fishing rod and having a spool S, first and second side covers 20 and 20' respectively coupled to opposite sides of the frame 10, the lock lever 30 for locking and unlocking the palm-side first side cover 20 provided on the side of the frame 10 opposite to the handle, and an elastic body such as a coil spring 41 or a torsion spring 42 for forcing the lock lever 30 to be operated in a locking direction.

More specifically, the fishing reel of the present invention is configured as follows. The palm-side first side cover 20 and a gear-side second side cover 20' coupled to the handle are respectively coupled to the opposite sides of the frame 10. A shaft of the spool S is coupled to respective shaft insert portions of the first and second side covers 20 and 20', and mounted on the frame 10 so that the spool S on which a fishing line is wound may be rotatable. Inside a palm-side mount 11 of the frame 10, various braking means are provided to provide rotational braking force of the spool S and are protected by the first side cover 20. Inside a gear side mounting of the frame 10, various parts including a drive gear are provided to interlock the shaft of the spool S and a handle and to operate a star drag and a tension nut (not shown), and are protected by the second side cover 20'. On the outside of the second side cover 20', the handle (not shown) is rotatably coupled thereto and is rotated together with the spool S.

In addition, on the palm-side mount 11 of the frame 10, a stop bar 12 is provided by projecting outward, thereby blocking a locking projection 33 of the lock lever 30.

The lock lever 30 is provided between the first side cover 20 and the palm-side mount 11 of the frame 10 to lock and unlock the first side cover 20, and the lock lever 30 is shafted to an inner surface of the first side cover 20 to be rotatable back and forth.

The lock lever 30 includes a body 31 shafted to the inner surface of the first side cover 20 to be rotatable, the locking projection 33 connected to the body 31 to be rotated together with the body when the body 31 is rotated and blocked by the stop bar 12 when the first side cover 20 is closed, and an opening portion 35 projecting from the body 31 to be exposed outside the first side cover 20 and rotating the body 31. In addition, the lock lever 30 is configured such that a rotational direction 1' of the body 31 rotated by the opening portion 35 is the same as a direction 1 in which the first side cover 20 is rotated and opens, thus the locking projection 33 is released from the stop bar 12.

In addition, the lock lever 30 has a rotating piece 32 which is configured such that a first end thereof is connected to the body 31 and a second end thereof has the locking projection 33, and is turned together with the body when the body 31 is rotated.

The elastic body elastically supports the lock lever 30 so that the body 31 is rotated in a second direction 2'. The elastic body may be formed by the coil spring 41 or the torsion spring 42.

When the first side cover 20 is rotated in the locking direction, the locking projection 33 is automatically blocked by the stop bar 12 thereby coupling the first side cover 20. Specifically, FIGS. 4A to 4E and FIG. 5 show a first embodiment with the coil spring 41 provided as the elastic body, in which a first end of the coil spring 41 is supported by the first side cover 20 and a second end thereof is supported by the lock lever 30, and elastic force of the coil spring 41 is exerted to turn the lock lever in the second direction 2'. In FIGS. 4A to 4E, rotational directions 1 and 1' for opening the first side cover 20 and the lock lever 30 operate in a clockwise direction thereby separating the first side cover 20 from the frame. FIG. 5 shows a modification of the first embodiment, which shows that the first side cover 20 and the lock lever 30 are rotated and turned in a counterclockwise direction thereby separating the first side cover 20 from the frame.

Figure 6A:
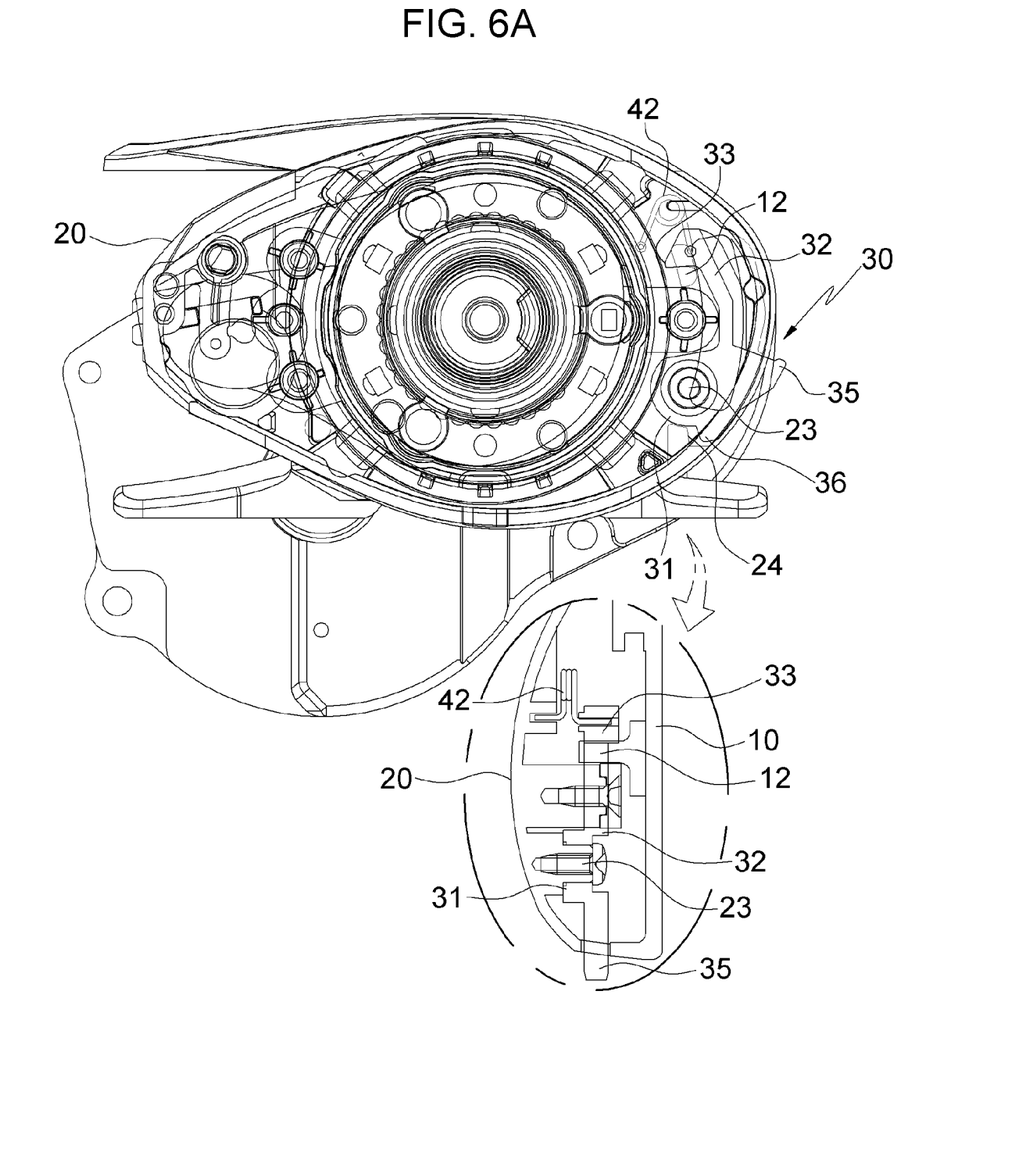
FIGS. 6A to 6E are side views showing a second embodiment of the present invention, which are classified according to the operation of the fishing reel.
Figure 6B:
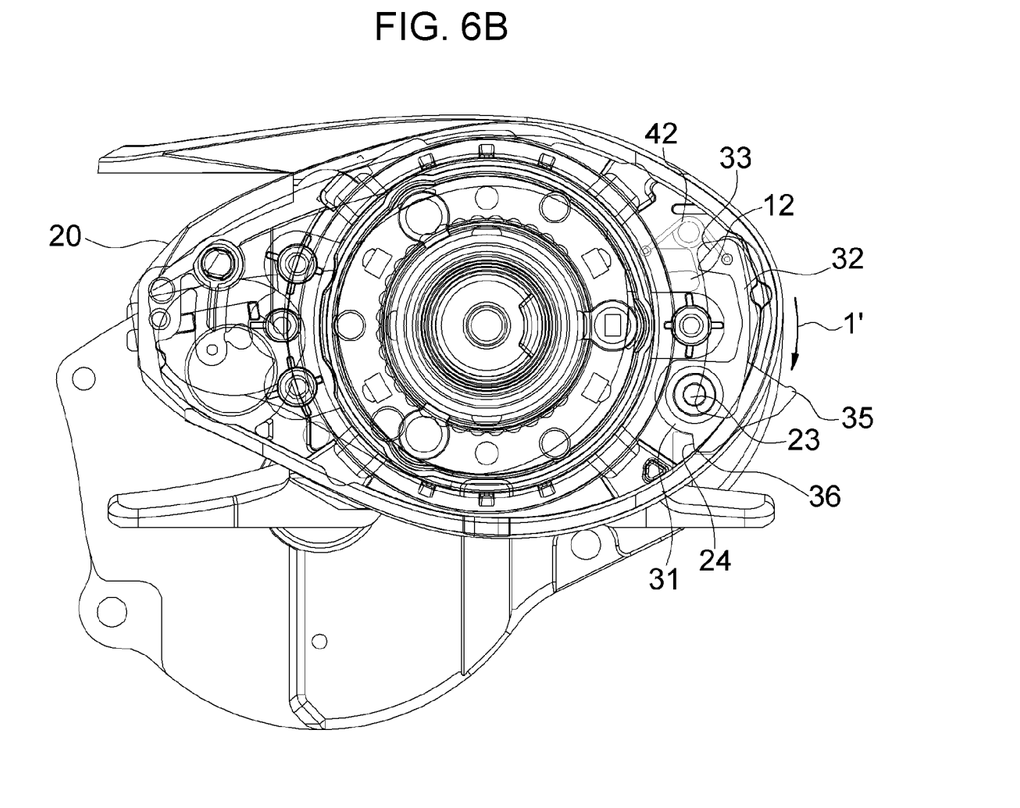
Figure 6C:
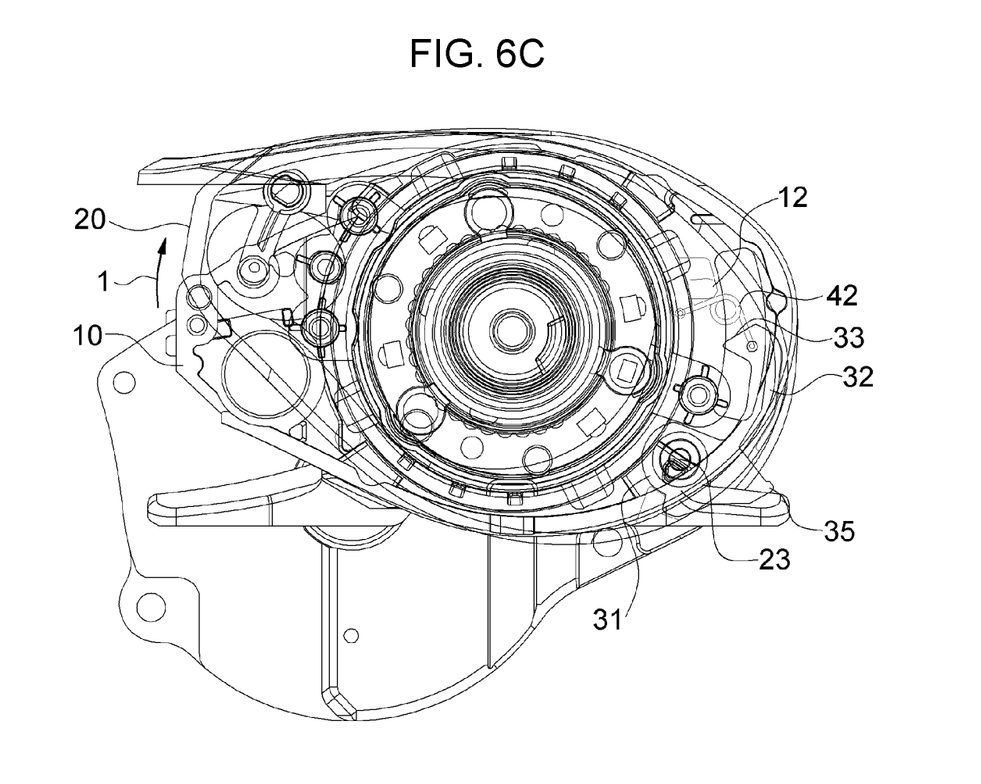
Figure 6D:
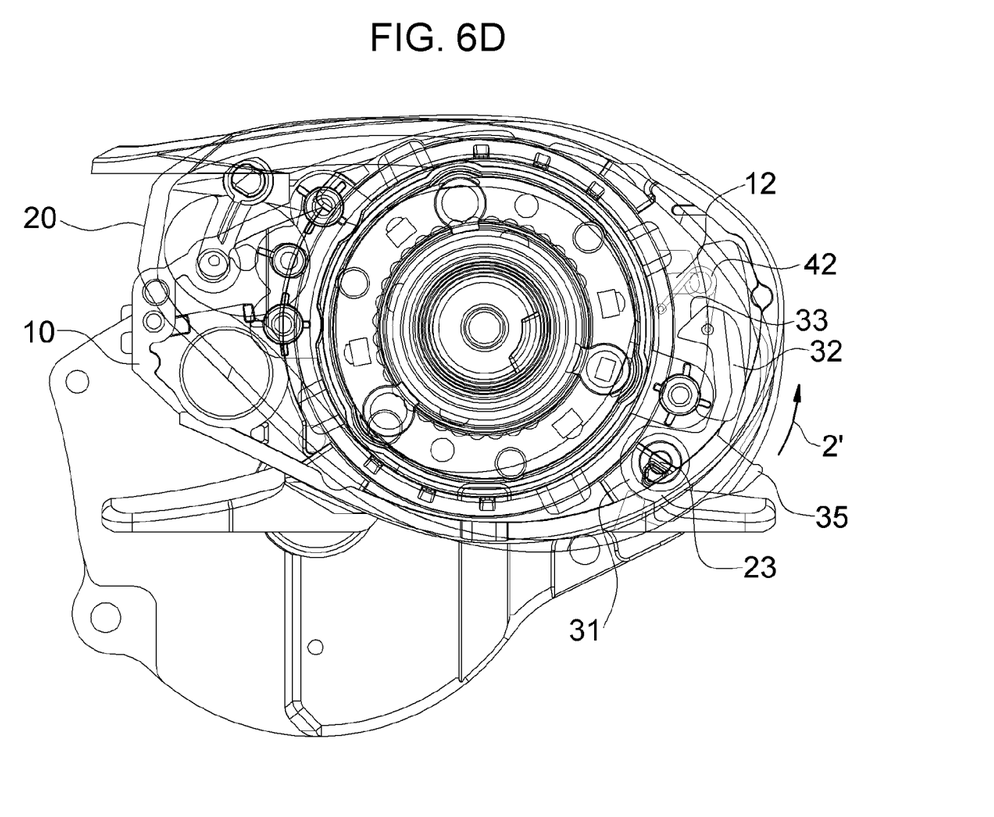
Figure 6E:
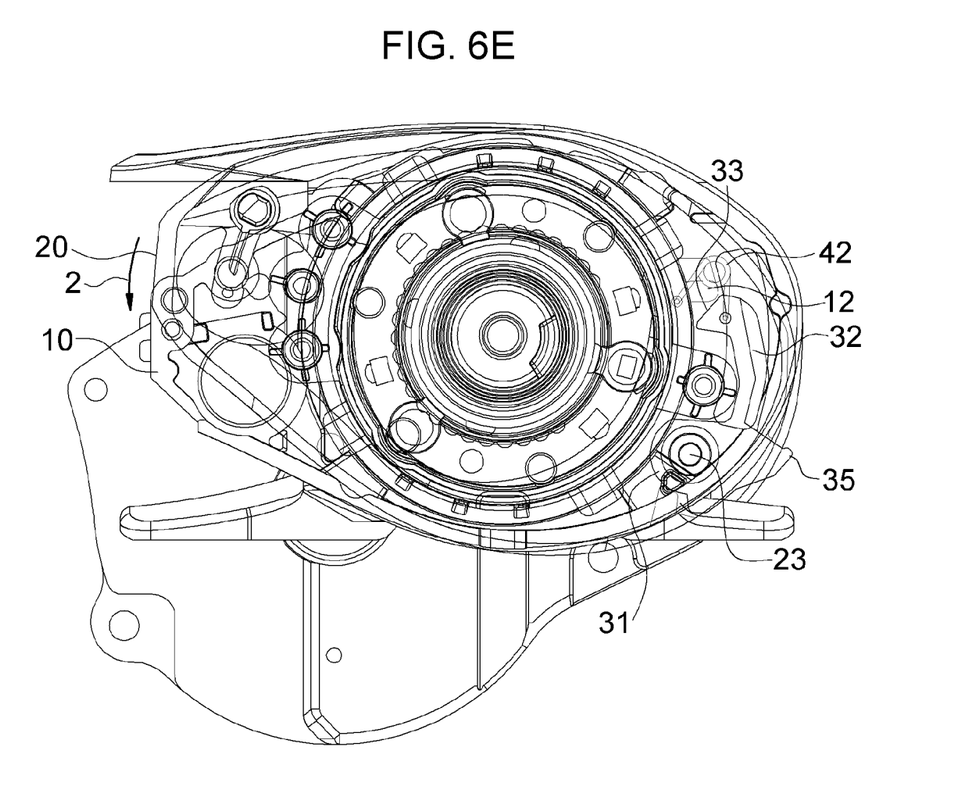
Figure 7:
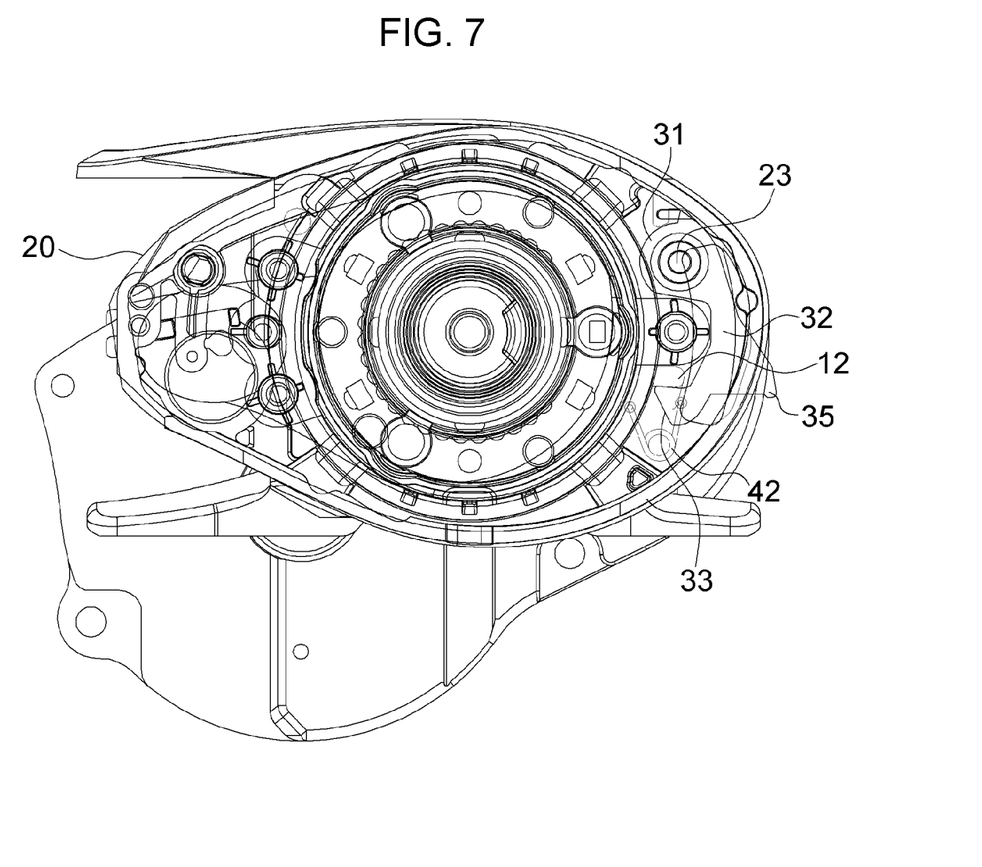
FIG. 7 is a side view showing a modification of the second embodiment.

In addition, FIGS. 6A to 6E and FIG. 7 show a second embodiment with the torsion spring 42 provided as the elastic body, in which a first end of the torsion spring 42 is connected to the first side cover 20 and a second end thereof is connected to the lock lever 30, and the elastic force of the torsion spring 42 is exerted to turn the lock lever 30 in the second direction 2'. In FIGS. 6A to 6E, rotational directions 1 and 1' for opening the first side cover 20 and the lock lever 30 operate in the clockwise direction, thereby separating the first side cover 20 from the frame. FIG. 7 shows a modification of the second embodiment, which shows that the first side cover 20 and the lock lever 30 are rotated and turned in the counterclockwise direction, thereby separating the first side cover 20 from the frame.

Hereinbelow, the embodiments of the present invention will be described with reference to the accompanying drawings.

As shown in FIGS. 4A to 4E, the body 31 of the lock lever 30 is shafted to the inner surface of the first side cover 20 by a bolt functioning as a rotating shaft 23.

This body 31 is connected to the opening portion 35 projecting to be exposed to the outside of the first side cover 20 and to an end of the rotating piece 32 extending toward the stop bar 12, respectively. In addition, the locking projection 33 projects inward from another end of the rotating piece 32.

In addition, on the other end of the rotating piece 32, a supporting portion 34 is provided by opening an outer-side (rear-side) on a side opposite to the side where the locking projection 33 projects. On the first side cover 20, a base portion 25 is provided by opening an inner-side (front-side) of the first side cover 20 to correspond to the supporting portion 34.

Therefore, opposite ends of the coil spring 41 are put between the supporting portion 34 and the base portion 25 to elastically support the rotating piece 32 to allow the rotating piece 32 to be rotated in the counterclockwise direction 2'.

The lock lever 30 includes a stopper 36 extending from the opening portion 35 in the clockwise direction 1 and projecting.

Accordingly, the first side cover 20 includes a stopping projection 24 projecting inward from a hole through which the opening portion 35 is exposed, thereby blocking the stopper 36.

Figure 4A:
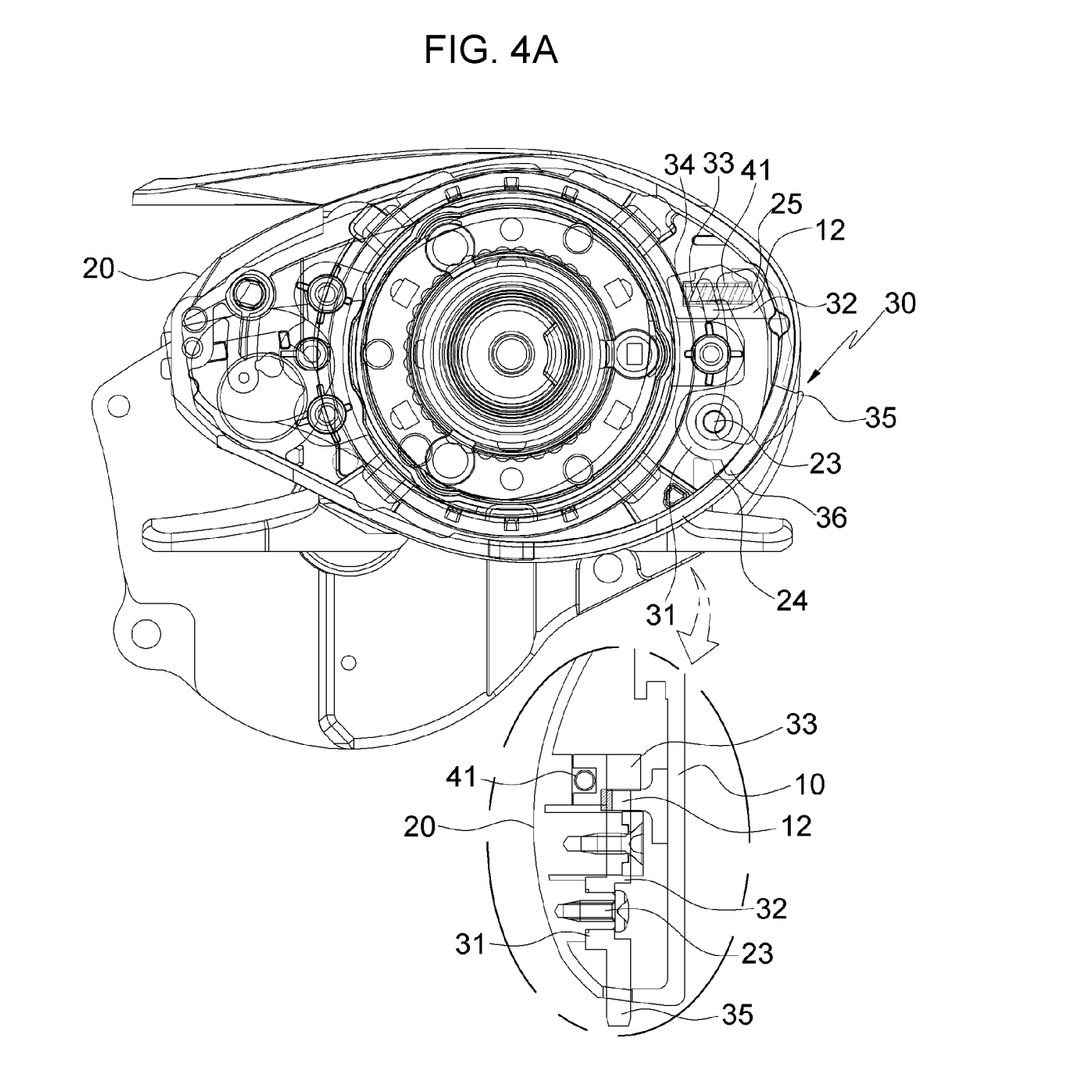
FIGS. 4A to 4E are side views showing a first embodiment of the present invention, which are classified according to operation of the fishing reel.
Figure 5:
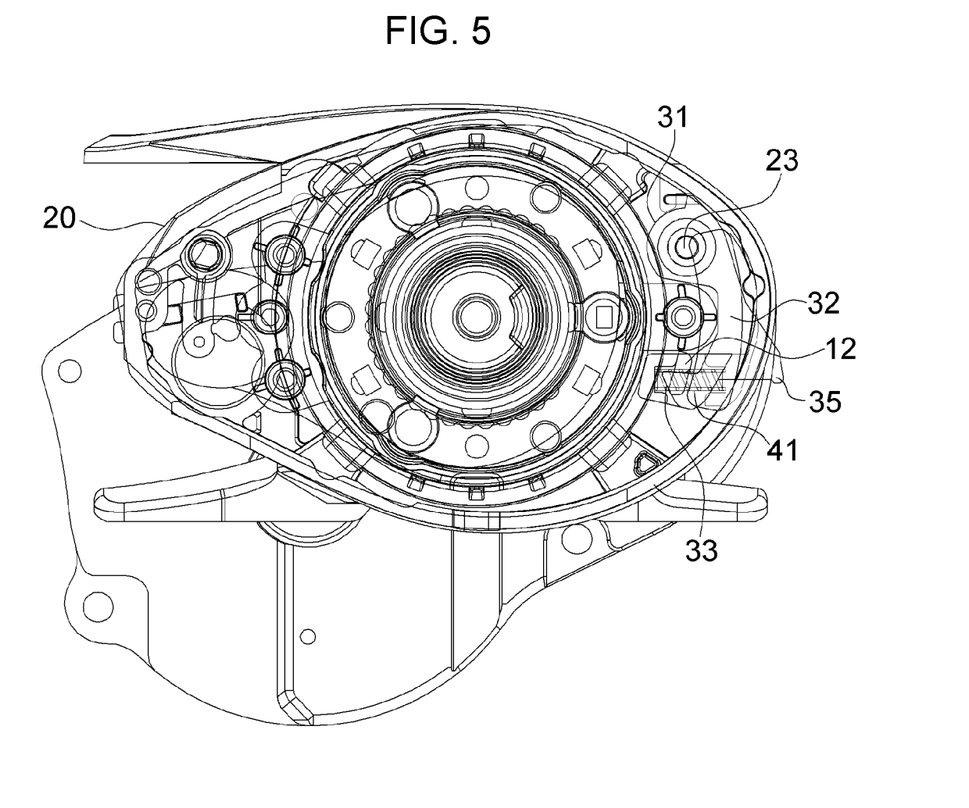
FIG. 5 is a side view showing a modification of the first embodiment.

In the first embodiment, as shown in FIG. 4A, the locking projection 33 is turned inward by the coil spring 41 and is blocked by the stop bar 12 in a state of coupling the first side cover 20 to the palm-side mount 11 of the frame 10, and the locking projection 33 prevents the first side cover 20 from rotating in the clockwise direction 1, thereby maintaining the first side cover 20 in a locked state.

Figure 4B:
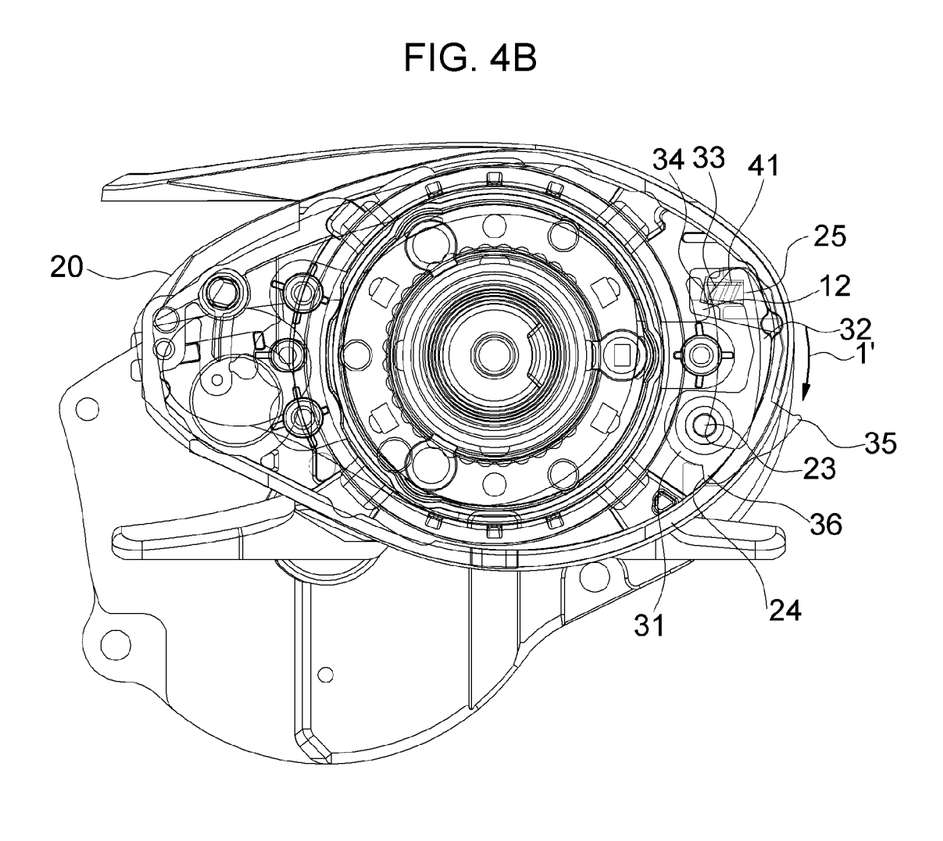

Then, in order to separate the first side cover 20, when a user rotates the opening portion 35 in the clockwise direction with the finger while holding the first side cover 20 with one hand, the body 31 is rotated in the same direction and the rotating piece 32 is rotated in the clockwise direction, as shown in FIG. 4B. At this time, the coil spring 41 is compressed while the base portion 25 is rotated with the rotating piece 32, and the locking projection 33 is released from the stop bar 12 through clockwise rotation of the rotating piece 32.

Figure 4C:
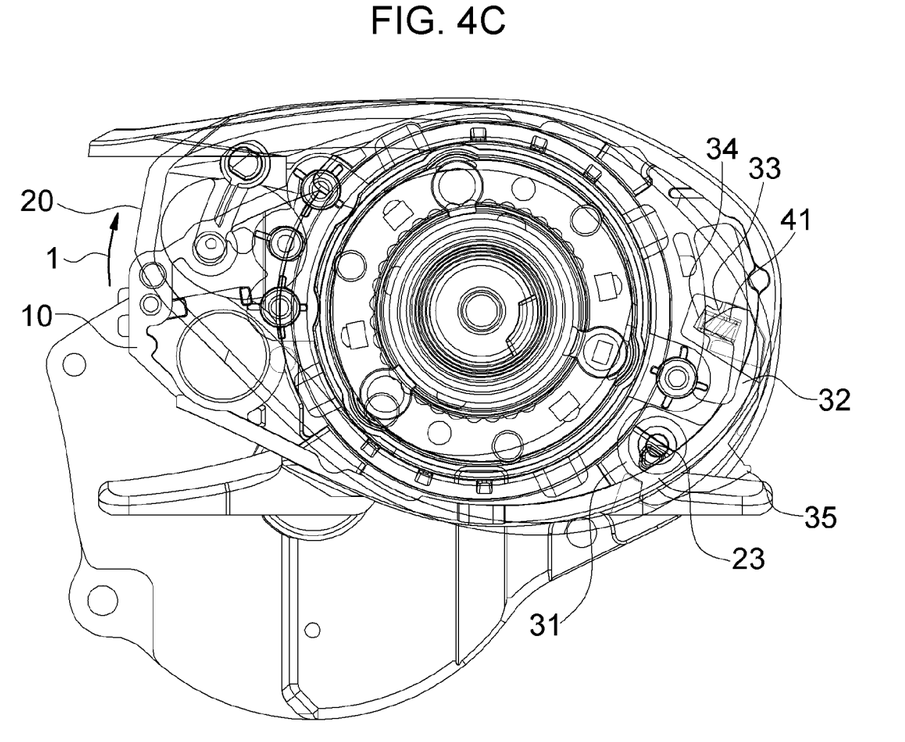

In the present invention, an unlocking direction 1' of the lock lever 30 and an opening rotational direction 1 of the first side cover 20 are the same in the clockwise direction. Therefore, in order to unlock the lock lever 30 in the clockwise direction, when the lock lever 30 is continuously compressed in the clockwise direction in a state in which the stopper 36 is blocked by the stopping projection 24 to stop rotation of the lock lever 30 as shown in FIG. 4C, the first side cover 20 is naturally rotated together therewith in the clockwise direction, so that the first side cover 20 may be separated from the frame 10.

Figure 4D:
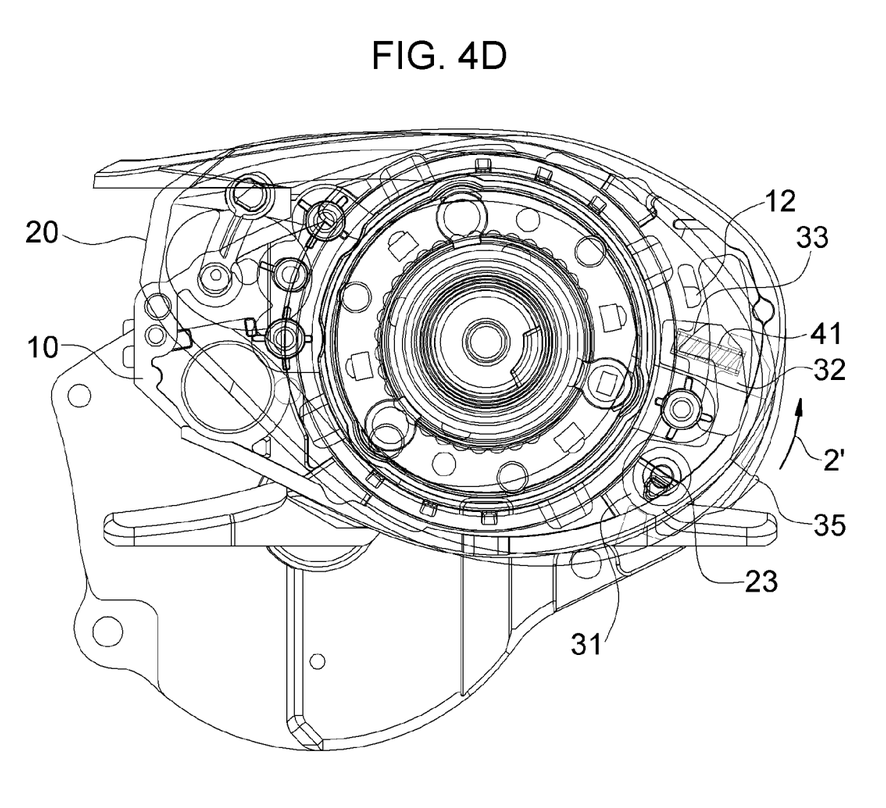

After the first side cover 20 is opened, when the lock lever 30 is released from applied external force, the lock lever 30 is turned in the counterclockwise direction 2' while the coil spring 41 is recovered, and the locking projection 33 returns to a lockable position about the stop bar 12, as shown in FIG. 4D.

Figure 4E:
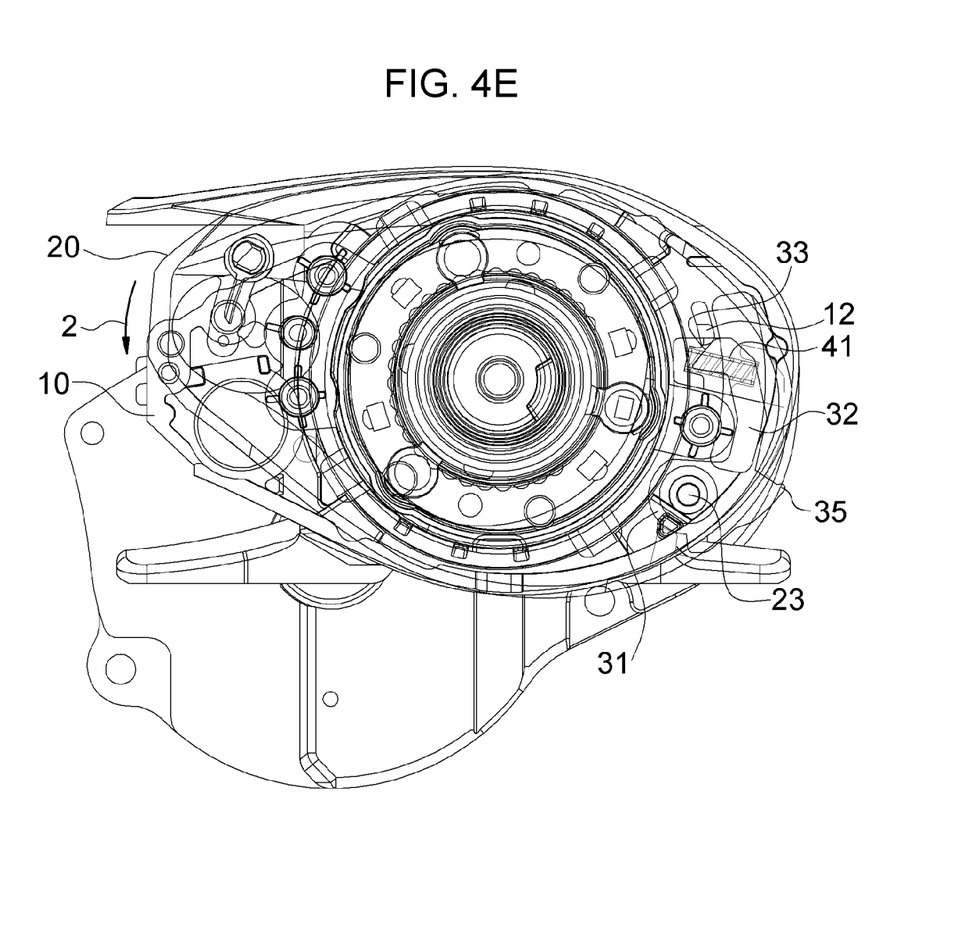

As shown in FIG. 4E, the drawing shows that the first side cover 20 is coupled to the frame. First, when the first side cover 20 is engaged in the palm-side mount 11 and is rotated in the counterclockwise direction 2, the stop bar 12 is placed on a rotation path of the locking projection 33. Here, the stop bar 12 compresses the locking projection 33 while contacting a slope of the locking projection 33 so that the locking projection 33 is rotated in the clockwise direction.

Accordingly, when the entire lock lever 30 is turned in the clockwise direction and the locking projection 33 passes the stop bar 12, the elastic force of the coil spring 41 is applied again and the entire lock lever 30 is turned in the counterclockwise direction, so that the locking projection 33 is blocked by the stop bar 12 thereby locking the first side cover 20.

In the modification of the first embodiment shown in FIG. 5, rotational opening and closing directions of the first side cover 20 and the lock lever 30 are opposite to the rotational opening and closing directions of the first embodiment, that is, opening directions of the first side cover 20 and the lock lever 30 are the counterclockwise direction, and closing directions thereof are the clockwise direction.

Because of a difference in the opening and closing directions, the locking projection 33, the supporting portion 34 and the opening portion 35 are not connected to the body 31 but are provided on to the rotating piece 32. However, other detailed operating methods are the same as the example of the first embodiment, so that detailed description will be omitted.

Next, the second embodiment will be described with reference to FIGS. 6A to 6E.

As shown in drawings, a basic structure of the second embodiment is the same as the first embodiment as described. However, there is only difference in that the torsion spring 42 in which both ends thereof exert elastic force in a closing direction is used in place of the coil spring 41. Accordingly, instead of the base portion 25 and the supporting portion 34, inserting holes are provided on a spool cover of the first side cover 20 and the rotating piece 32, and the both ends of the torsion spring 42 are inserted therein.

As shown in FIG. 6A, the lock lever 30 is forcibly turned in the clockwise direction by the torsion spring 42 as in the first embodiment, and the locking projection 33 is blocked by the stop bar 12, so that the locked state of the first side cover 20 is maintained.

When the opening portion 35 is pressurized in the clockwise direction 1' to separate the first side cover 20, as shown in FIG. 6B, the entire lock lever 30 is turned in the clockwise direction, and the both ends of the torsion spring 42 are opened, so that the locking projection 33 is released from the stop bar 12.

In this state, when the lock lever 30 is continuously pressurized in the clockwise direction 1' as shown in FIG. 6C, the first side cover 20 is rotated together therewith in the clockwise direction 1, so that the first side cover 20 may be separated from the frame 10.

When the external force applied to the lock lever 30 is removed, the both ends of the torsion spring 42 are closed and the lock lever 30 is turned in the counterclockwise direction 2', so that the locking projection 33 is recovered to its original position, as shown in FIG. 6D.

In this state, when the first side cover 20 is engaged in the palm-side mount 11 and is rotated in the counterclockwise direction 2, the locking projection 33 comes into contact with the stop bar 12, and the lock lever 30 is turned in the clockwise direction and then is recovered in the counterclockwise direction, as shown in FIG. 6E. Therefore, the locking projection 33 is blocked by the stop bar 12 thereby locking the first side cover 20.

In the modification of the second embodiment shown in FIG. 7, rotational opening and closing directions of the first side cover 20 and the lock lever 30 are opposite to the rotational opening and closing directions of the second embodiment, that is, opening directions of the first side cover 20 and the lock lever 30 are the counterclockwise direction, and a closing direction of the first side cover 20 and the lock lever 30 is the clockwise direction.

Because of a difference in the opening and closing directions, the locking projection 33 and the opening portion 35 are not connected to the body 31, but are provided on the rotating piece 32. However, other detailed operating methods are the same as the second embodiment, so that detailed description will be omitted.

The present invention having this configuration has following features, it is convenient to use because the first side cover 20 may be opened with one hand, there is no risk of losing the first side cover 20 because the lock lever 30 may be operated by holding the first side cover 20, and the first side cover 20 may be opened more easily and quickly because the opening directions of the lock lever 30 and the first side cover 20 are the same, In addition, when the first side cover 20 is coupled to the frame, the lock lever 30 performs the locking operation automatically only by locking operation of first side cover 20 without separate operation of the lock lever 30.

Therefore, the first side cover 20 may be intuitively and very conveniently attached and detached.

Hereinafter, the present invention is described as the fishing reel in which the palm-side first side cover is separated by rotating in the first direction with reference to the accompanying drawings. However, the present invention may be variously modified, added and substituted by those skilled in the art, and such modifications, additions and substitutions should be interpreted as scope and spirit of the invention as disclosed in the accompanying claims.

What is claimed is:

1. A fishing reel in which a palm-side first side cover provided on a side of a frame opposite to a handle is separated by rotating the cover in a first direction, the fishing reel comprising:
   a stop bar projecting from a palm-side mount of the frame; and
   a lock lever which includes a body shafted to an inner-side surface of the first side cover to be rotatable, a locking projection connected to the body to be turned together with the body when the body is rotated and blocked by the stop bar when the first side cover is closed, and an opening portion projecting from the body to be exposed outside the first side cover and rotating the body, and which is configured such that a rotational direction of the body rotated by the opening portion is the same as a direction in which the first side cover is rotated and opens so that the locking projection is released from the stop bar,
   wherein, when the lock lever is turned in an unlocking direction, the first side cover is rotated together therewith and is separated from the frame.

2. The fishing reel of claim 1, further comprising:
   an elastic body for elastically supporting the lock lever so that the body is rotated in a second direction,
   wherein, when the first side cover is rotated in a locking direction, the locking projection is automatically blocked by the stop bar and the first side cover is coupled to the frame.

3. The fishing reel of claim 2, wherein the elastic body comprises a coil spring that is configured such that a first end thereof is supported by the first side cover and a second end thereof is supported by the lock lever, thereby exerting elastic force to turn the lock lever in the second direction.

4. The fishing reel of claim 2, wherein the elastic body comprises a torsion spring that is configured such that a first end thereof is connected to the first side cover and a second end thereof is connected to the lock lever, thereby exerting elastic force to turn the lock lever in the second direction.

* * * * *